United States Patent [19]

Mayer

[11] 4,441,333
[45] Apr. 10, 1984

[54] TRANSPORT REFRIGERATION UNIT COMBINATION AIRFLOW STRAIGHTENER AND DEFROST DAMPER

[75] Inventor: Donald K. Mayer, Bloomington, Minn.

[73] Assignee: Thermo King Corporation, Minneapolis, Minn.

[21] Appl. No.: 398,528

[22] Filed: Jul. 15, 1982

[51] Int. Cl.³ .............................................. B60H 3/04
[52] U.S. Cl. ................................... 62/239; 98/41 R; 239/461; 251/304
[58] Field of Search ................ 62/239, 408; 98/41 R, 98/40 N; 251/121, 304; 239/390, 461, 590.3

[56] References Cited

U.S. PATENT DOCUMENTS

| | | | |
|---|---|---|---|
| 2,462,989 | 3/1949 | Mufich et al. | 98/41 R X |
| 2,780,923 | 2/1957 | Jones | 62/408 X |
| 2,937,510 | 5/1960 | Allyne | 62/408 X |
| 3,100,384 | 8/1963 | Lowensohn | 62/239 X |
| 3,387,550 | 6/1968 | Thomson | 98/41 R X |
| 3,412,571 | 11/1968 | Bolynn | 62/239 X |
| 3,420,448 | 1/1969 | Snow | 98/41 R X |
| 3,699,872 | 10/1972 | Kruger | 251/304 X |
| 3,919,929 | 11/1975 | Harmon | 98/41 R |

Primary Examiner—William E. Tapolcai
Attorney, Agent, or Firm—E. C. Arenz

[57] ABSTRACT

A honeycomb assembly 32 located in the air discharge nozzle portion 30 of a transport refrigeration unit is movable from one position as shown in FIG. 2 in which the assembly functions as an airflow straightener and air throw increaser, to another position as shown in FIG. 4 in which the honeycomb assembly blocks airflow through the discharge nozzle and functions as a defrost damper.

3 Claims, 4 Drawing Figures

4,441,333

TRANSPORT REFRIGERATION UNIT COMBINATION AIRFLOW STRAIGHTENER AND DEFROST DAMPER

FIELD OF THE INVENTION

This invention pertains to the art of transport refrigeration units such as are commonly used on trucks and trailers to provide cooling and/or heating for the load being carried.

BACKGROUND OF THE INVENTION

It has been known for many years that the use of so called honeycomb elements disposed in an air nozzle through which air is discharged can perform an airflow straightening function as well as in effect increasing the throw of the air through the straightening function. It has also been known to applicant's assignee from experimentation that a honeycomb flow straightener applied in the discharge air outlet or nozzle of a transport refrigeration unit could provide improved evaporator air throw. However such straighteners were not applied commercially because they were not considered necessary in view of the relatively shorter trailers then in use for the most part. However the desirability of the use of honeycomb flow straighteners may be considered to be increasing in view of somewhat longer trailers presenting the problem of getting sufficient air throw to the rear end of the trailer.

In most of the transport refrigeration units used on trailers the unit is capable of providing either cooling or heating, or if cooling only, some means is provided to defrost the refrigerant evaporator coil of the unit. When the coil is being defrosted, ordinary practice is to close an airflow damper, to prevent the flow of air through the evaporator while the defrosting operation is going on. The defrost damper is ordinarily located in the air discharge nozzle space where a honeycomb flow straightener would best be located if to be within the confines of the unit. While a defrost damper can be located other than in the air discharge nozzle, such a relocation would create problems with respect to other internal equipment already located in ways which would interfere with a relocation of the defrost damper.

It is the aim of my invention to provide an arrangement in which a honeycomb airflow straightener assembly is located in the air discharge nozzle passage and, it is unnecessary to relocate the defrost damper.

SUMMARY OF THE INVENTION

In accordance with the essence of the invention, an arrangement is provided in which a honeycomb airflow straightener assembly is located in the discharge air nozzle passage of the unit and is movable between one position in which the honeycomb passages are oriented to direct the air out of the nozzle, and an opposite position in which the honeycomb passages are oriented transversely to the normal flow of air and accordingly block the airflow through the passage and thus function as an airflow damper for purposes of defrost.

DESCRIPTION OF A PREFERRED EMBODIMENT

Figure 1:
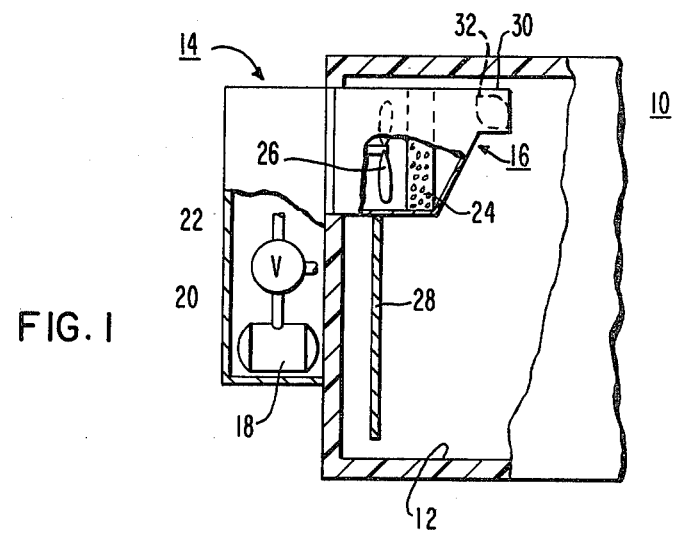
FIG. 1 is a partly-broken and partly schematic side elevation of one type of transport refrigeration unit to which the invention may be applied, and as installed at the front of a trailer.

Referring to FIG. 1, the front end of a trailer 10 in which a refrigerated load is to be hauled in the served space 12 is shown, with one particular model of transport refrigeration unit installed at the nose of the trailer. The unit comprises an outdoor section 14, typically called the condenser section, and an interior section 16, typically called the evaporator section. A compressor 18 is schematically illustrated as being in the condenser section, and it delivers hot gaseous refrigerant through a discharge line 20 connected to a three way valve 22 which, in one position passes the refrigerant to a condenser (not shown) for a cooling mode of operation, and in an opposite position passes the refrigerant to the evaporator 24 when the unit is in either a heating, or a defrost mode of operation.

Besides the evaporator coil 24 in the evaporator section 16, that section includes means for drawing air from the interior 12 and passing it through the evaporator coil 24 and then discharging it back into the load space 12. The means illustrated schematically is a propeller fan 26 which draws air in part from near the floor level of the load space as indicated by the directional arrrow, up behind the baffle 28, then through the evaporator coil 24 and back into the load space through the discharge nozzle section 30. The honeycomb assembly according to the invention and generally designated 32 is located in the discharge nozzle or passage 30 of the evaporator section.

Figure 2:
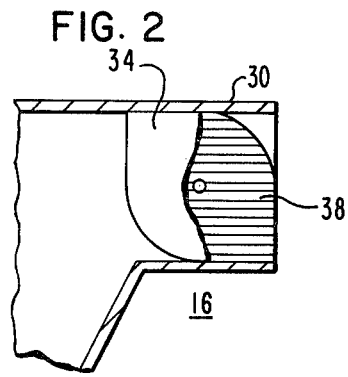
FIG. 2 is a fragmentary, partly-broken side view of the discharge nozzle portion of the unit with the honeycomb assembly installed therein and in an orientation to direct discharge air into the load space of the trailer.
Figure 3:
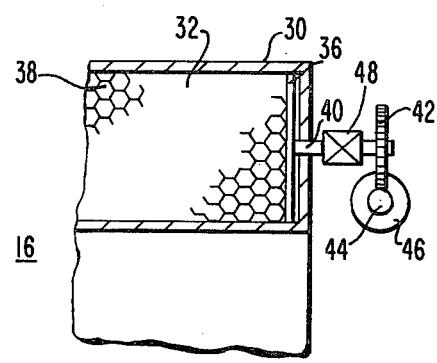
FIG. 3 is a fragmentary, front elevation view of the discharge nozzle portion of the unit and with the honeycomb assembly in its air discharging position.

Turning now to FIGS. 2 and 3, the honeycomb assembly 32 basically comprises a generally rectangular frame with opposite end plates 34 and 36 within which the honeycomb elements 38 are installed to form the complete assembly.

The means for repositioning the honeycomb assembly can take any of various forms. One example is illustrated in FIG. 3 in which the opposite end plates 34 and 36 have stub shafts 40, supported by bearings 48. To the stub shaft 40, a gear 42 is attached, which in turn is driven by a worm gear 44 driven in turn by an actuator 46 to rotate the assembly. Obviously, other forms such as linkages and so on could be alternatively used.

The particular size of the honeycomb is determined in accordance with the airflow characteristics of each particular model to which the invention is applied. For most units it is believed that elements sized so that somewhere between five to ten diameters of an element to the length of the element will provide satisfactory results. It will of course be appreciated that, for a given length, the higher the ratio of length to diameter, the more expensive the assembly and the greater the resistance to airflow provided by the assembly.

The term honeycomb is used herein generically and is not to be construed to be limited to elements having a hexagonal shape, but can also include egg crate-like shapes or other configurations.

Figure 4:
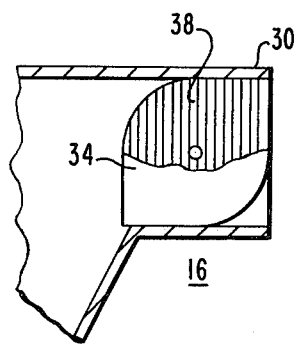
FIG. 4 is a view similar to FIG. 2 but with the honeycomb assembly rotated to its air blocking position to function as a defrost damper.

In most installations it will be desirable to provide seal means around the frame to prevent inordinate leakage of air around the assembly when it is in a defrost position as shown in FIG. 4. These seal means may take any of various forms, one type suggested by another being strips of bristle or brush-like material.

What I claim is:

1. A transport refrigeration unit serving a vehicle load space, including:

a refrigerant evaporator coil;

means for drawing air from said load space and passing said air through said coil and directing said air back to said space;

means defining a passage through which air is directed back into said load space from said unit, said passage means having a generally rectangular shape in planes parallel to the direction of airflow;

means for defrosting said coil periodically;

honeycomb-like air straightener means in assembly form located in said passage, said assembly form having a generally rectangular shape in cross-section parallel to the direction of airflow with two opposite corner portions rounded to permit rotation of said assembly 90° within said passage means;

means for moving said assembly between one position in which said air straightener means are oriented to direct air out of said passage into said load space and an opposite position in which said air straightener means are oriented to block airflow through said passage and function as an airflow damper.

2. A unit according to claim 1 wherein:
   said assembly is pivotally mounted in said passage.

3. A unit according to claim 1 wherein:
   the ratio of length of each of said air straightener means to the diametral dimension is in the order of five to ten to one.

* * * * *